United States Patent Office 3,325,559
Patented June 13, 1967

3,325,559
PRODUCTION OF 4-METHYLPENTENE-1
Alan Arthur Yeo, James Keith Hambling, and Geoffrey Winton Alderson, all of Sunbury-on-Thames, Middlesex, England, assignors to The British Petroleum Company Limited, London, England, a British joint-stock corporation
No Drawing. Filed Mar. 15, 1961, Ser. No. 95,802
Claims priority, application Great Britain, Mar. 23, 1960, 10,368/60; May 31, 1960, 19,212/60; July 15, 1960, 24,723/60; Nov. 22, 1960, 40,094/60
6 Claims. (Cl. 260—683.15)

This invention relates to a process for the dimerisation of propylene to obtain 4-methylpentene-1.

In British patent specification 824,917 is disclosed a process for dimerising propylene to a hexene product consisting of hexene isomers which comprises reacting propylene in the presence of an alkali metal catalyst at a temperature of from 100° F. to 400° F. and a pressure of from 1 atmosphere to 100 atmospheres. It is stated that the catalyst may be a liquid metal catalyst, metal in a film on an inert support, or a solid metal catalyst. Thus a typical catalyst consisting of potassium metal dispersed on potassium carbonate.

In British patent specification 825,902 it is disclosed that compounds of alkali metals with elemental carbon, the ratio of alkali metal to carbon being 1:8 to 1:64, act as polymerisation agent and in illustration there is described the polymerisation of alpha-methylstyrene to high molecular weight products using a catalyst of the formula $KC_8$.

Thus according to one aspect of the present invention there is provided a process for the production of 4-methylpentene-1 which comprises maintaining propylene in contact with a catalyst consisting of or containing a lamellar complex of potassium and carbon and having the formula $KC_x$, where $x$ has a value of 8 or 16.

If desired mixtures of the complex may be used. The production of potassium complexes is described by W. Rudoff and E. Schulze in Zeitung Anorg. u. allgem. Chem. vol. 277 at page 156 et seq. (1954).

Usually a pre-formed complex of the type hereinbefore described will be brought into contact with propylene; this is not essential if the polymerisation conditions are such that the complex will form in situ and in this case a mixture of potassium and carbon may be contacted with propylene.

The catalyst may consist wholly of the lamellar complex or may consist of or contain a mixture of the lamellar complex with an alkali metal supported on carbon, said mixture containing the lamellar complex in any proportion. The proportion of the catalyst existing as lamellar complex will be determined, at least in part, by the nature of the carbon employed and by the relative proportions of alkali metal and carbon. Furthermore, if desired, the catalyst may contain free carbon. If desirable, the catalyst may contain free alkali metal.

The carbon will preferably be wholly or partly in the form of natural or synthetic graphite. However, other forms of carbon may be employed providing that they are capable of reacting with an alkali metal to form a lamellar complex. Thus there may be employed forms of carbon which contain graphite in microcrystalline form together with carbon of a nature which does not form lamellar complexes with alkali metals. The carbon employed may contain trace impurities in the form of metal compounds. Metals derived from trace impurities, for example, iron, silicon and aluminium, may form an association with these lamellar structures, and may exert a modifying effect upon the reactions according to this invention.

It is believed that under certain conditions the polymer initially formed will be, in part, isomerised while in association with the catalyst. It is probable that trace elements which modify the action of the lamellar compounds or complexes do so by changing the rate of an isomerisation reaction relative to the polymerisation reaction. Variations in yield at a given value of $x$ are to be expected when using $KC_x$ complexes derived from different sources of carbon. These variations probably arise from variations in the amounts of trace impurities which, it is believed, exert a modifying action on the course of the reaction. In general $KC_x$ compounds derived from carbon of low ash content favour high yields of 4-methylpentene-1.

Preferably the catalyst is free of elements other than potassium and carbon. In any case the structure of the complex will be essentially that of a lamellar complex of only alkali metal and carbon.

The effect of trace elements is particularly marked when using a $KC_x$ compound in which $x$ is 24.

Thus, according to another aspect of this invention there is provided a process for the production of 4-methylpentene-1 which comprises maintaining propylene in contact with a catalyst consisting of or containing a lamellar complex of potassium and carbon and having the formula $KC_{24}$, said catalyst having a low content of trace elements or being free of said trace elements. Preferably the $KC_{24}$ complex is derived from carbon having an ash content less than 0.1% by wt.

The invention will hereinafter be described with reference to the use of $KC_x$ where $x$ is 8, 16 or 24.

The preferred reaction temperature will lie in the range −10° to 200°, and more particularly 100–160° C. Above 200° C. higher polymers are formed.

Usually the reaction pressure will be superatmospheric, preferably being in the range 50 to 4000 lbs./sq., in. gauge. The combination of polymerisation conditions employed will be selected to favour the formation of 4-methylpentene-1.

The process will usually be carried out in the absence of a solvent.

Preferably the propylene employed as feedstock will be free of water. In general, the propylene should have a water content not greater than 0.001% by wt.; in comparison with a process using propylene saturated with water the improvement in yield of propylene dimer, using suitable reaction conditions is usually quite marked and in certain cases may be as much as 30% by wt.

It will be apparent that it is essential to avoid conditions which would lead to the presence of a slug of water in liquid phase reaching the polymerisation catalyst.

Preferably the propylene employed as feedstock will be free of allene and of methylacetylene. In general, if these compounds are present they should constitute in total less than 0.02% by weight of the propylene.

Preferably compounds employed as feedstock for the process of this invention are treated, before use, for the reduction of allene and/or methylacetylene content by selective hydrogenation over a supported nickel catalyst, for example, nickel-on-sepiolite.

The propylene should be free of oxygen; if present it should not constitute more than 5 p.p.m. by wt. based on propylene.

If desired the propylene may be employed in the presence of a gas which is inert under the conditions of the reaction. Thus nitrogen, methane, ethane or propane may be present in the feedstock.

The reaction may be carried out batchwise or continuously.

The catalyst may be employed as a fixed bed, a fluidised bed or as a slurry in solvent or in one or more of the reaction products.

According to another aspect of this invention there is provided a process which comprises maintaining propylene in contact with a catalyst consisting of or containing a lamellar complex of potassium and carbon and having the formula $KC_x$ where $x$ is 8 or 16 recovering from the product a $C_6$ fraction and recovering from the $C_6$ fraction 4-methylpentene-1.

According to a modification of this process there is used a catalyst consisting of or comprising the lamellar complex $KC_{24}$, said catalyst having a low content of trace elements or being free of said trace elements.

Product recovery will usually be achieved by distillation. Usually distillation will be carried out in a column of at least 60 theoretical plates, suitably circa 100 theoretical plates.

The invention is illustrated but not limited with reference to the following example.

EXAMPLE 1

6.5 grams of potassium with 16 grams of graphite were heated at 275° for 1 hour in an atmosphere of nitrogen. After cooling in nitrogen the solid was transferred (in nitrogen) to a 1 litre stainless steel autoclave. The autoclave was heated to 160° C. and liquid propylene passed in under nitrogen pressure to a gaseous pressure of 1500 lbs./sq. in. gauge. The mixture was rocked for 20 hours and excess propylene and reaction products collected in traps cooled at −78° C. Excess propylene was allowed to evaporate and the residue distilled and analysed by infra-red and gas chromatographic techniques. Composition of the propylene was:

| | Mol percent |
|---|---|
| $C_3H_6$ | 99.29 |
| $C_3H_8$ | 0.63 |
| $C_2H_6$ | 0.08 |

Composition of the graphite used for the production of catalyst was as follows:

TABLE 1

| Run No. | 1 | 2 |
|---|---|---|
| Ash at 900° C. (percent by weight) | 0.15 | 0.60 |
| Main impurities | Fe, Si, Al | Fe, Si |
| Surface area (sq. meters/gram) | 18 | 93 |

Yield of product and product analysis were as shown in Table 2.

TABLE 2

| Run No. | 1 | 2 |
|---|---|---|
| Carbon/potassium mol ratio | 8 | 8 |
| Yield (gms.) | 148 | 111 |
| Percent $C_6$ | 97 | 99 |
| Product analysis (percent by weight total product): | | |
| 4-methylpentene-1 | 85.8 | 58.4 |
| 4-methylpentene-2 | 6.3 | 33.3 |
| 2-methylpentene-2 | 0.6 | 2.8 |
| 2-methylpentene-1 | 3.0 | 2.0 |
| 2-hexenes | 3.8 | 3.5 |

EXAMPLE 2

The conditions employed according to Example 1 were followed except that 6.5 grams of potassium were used with 48 grams of graphite having an ash content of 0.05% by wt. The mol ratio of graphite to potassium was thus 24:1.

Yield of product was 182 grams of hexenes, having the following composition.

| | Percent by weight |
|---|---|
| 4-methylpentene-1 | 55.8 |
| 4-methylpentene-2 | 32.9 |
| 2-methylpentene-2 | 4.3 |
| 2-methylpentene-1 | 2.3 |
| Normal hexenes | 4.7 |

EXAMPLE 3

The conditions employed according to Example 1 were followed except that the reaction temperature was 140° C.

The composition of the hexenes produced was:

| | |
|---|---|
| 4-methylpentene-1 | 62.5 |
| 4-methylpentene-2 | 29.3 |
| 2-methylpentene-2 | 2.7 |
| 2-methylpentene-1 | 3.1 |
| Normal hexenes | 2.4 |

Under the reaction temperature employed the yield of hexenes was low, being 25 grams. Thus although the proportion of 4-methylpentene-1 based on $C_6$ in product is high the absolute yield of 4-methylpentene-1 is adversely effected by the use of a low reaction temperature.

It is an advantage of the process of the invention that there may be achieved a fast rate of reaction and that long catalyst life may be attained.

We claim:
1. A process for the production of 4-methylpentene-1, which comprises: contacting propylene with a catalyst consisting essentially of a lamellar complex of potassium and graphite having the formula $KC_x$, where $x$ has a value of between 8 and 24.
2. A process according to claim 1 in which, the reaction temperature lies in the range of 100° C. to 160° C.
3. A process according to claim 1 in which, the reaction pressure lies in the range of 50–4000 p.s.i.g.
4. A process for the production of 4-methylpentene-1, which comprises: contacting propylene with a catalyst consisting essentially of a lamellar complex of potassium and graphite and having the formula $KC_{24}$, said catalyst being substantially free of trace elements.
5. A process according to claim 4 in which, the reaction temperature lies in the range of between about 100° C. and about 160° C.
6. A process according to claim 5 in which, the reaction pressure lies in the range of about 50–4000 p.s.i.g.

References Cited
UNITED STATES PATENTS

| | | | |
|---|---|---|---|
| 2,881,234 | 4/1959 | Esmay et al. | 260—683.15 |
| 2,965,624 | 12/1960 | Anderson | 260—84.2 |
| 2,986,588 | 5/1961 | Schramm | 260—683.15 |

FOREIGN PATENTS 825,902   12/1959   Great Britain.

PAUL M. COUGHLAN, JR., *Primary Examiner.*

ALPHONSO D. SULLIVAN, *Examiner.*